No. 624,380. Patented May 2, 1899.
F. B. RISING.
TABLE CUTLERY.
(Application filed Mar. 6, 1899.)
(No Model.)
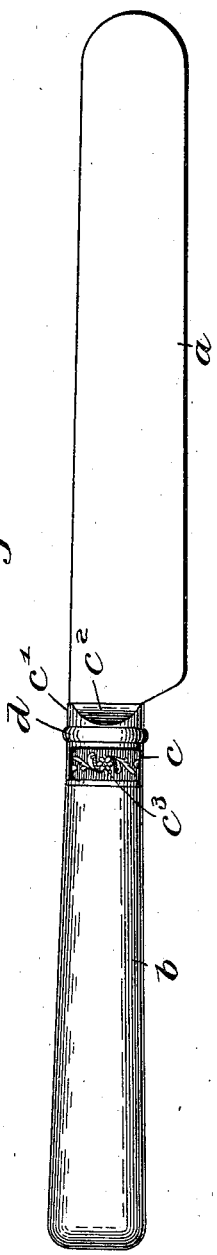
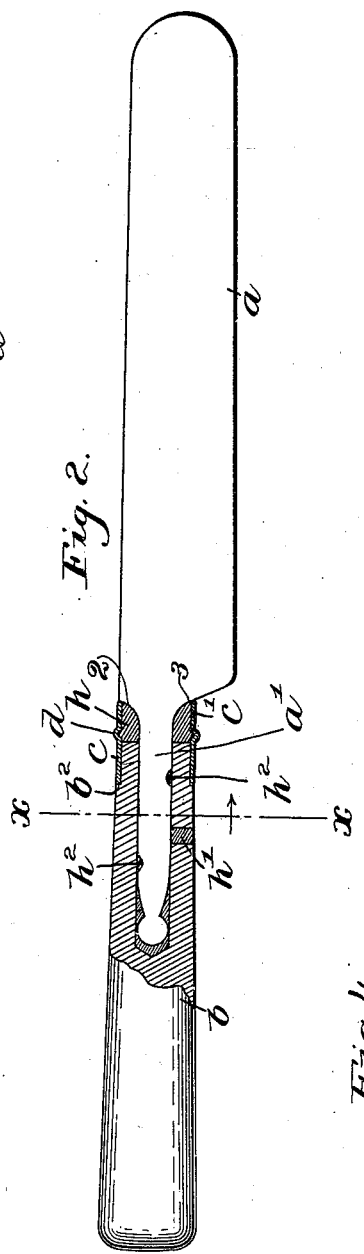
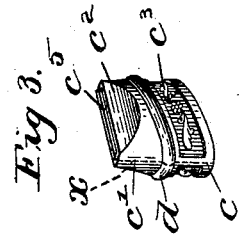
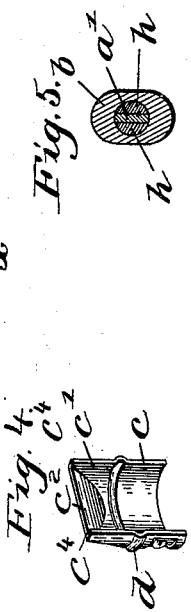
WITNESSES.
Charles F. Logan.
Fred S. Greenleaf.
INVENTOR.
FREDERICK B. RISING.
BY Crosby Gregory
ATTYS.
THE NORRIS PETERS CO., PHOTO-LITHO., WASHINGTON, D. C.

UNITED STATES PATENT OFFICE.

FREDERICK B. RISING, OF ANTRIM, NEW HAMPSHIRE, ASSIGNOR TO THE GOODELL COMPANY, OF SAME PLACE.

TABLE-CUTLERY.

SPECIFICATION forming part of Letters Patent No. 624,380, dated May 2, 1899.

Application filed March 6, 1899. Serial No. 707,824. (No model.)

*To all whom it may concern:*

Be it known that I, FREDERICK B. RISING, of Antrim, county of Hillsborough, State of New Hampshire, have invented an Improvement in Table-Cutlery, of which the following description, in connection with the accompanying drawings, is a specification, like letters and figures on the drawings representing like parts.

This invention has for its object to improve table-cutlery, such as knives and forks.

Prior to this invention it has been customary to forge a bolster solidly on a knife or fork at the base of the tang which enters the handle, the end of the handle being surrounded with a ferrule which abuts against the bolster, and so, also, it has been customary to put a tang in a handle and then cast within the handle and about the tang soft metal, it extending beyond the end of the handle and entering a mold to constitute a ferrule, the metal so cast adhering to the tang and being subsequently finished externally to present the proper configuration for the bolster.

Herein I have produced table-cutlery in which the inner end of the handle is finished by a sheet-metal bolster and ferrule, the ferrule part surrounding the end of the handle, the bolster part making the finish between the end of the handle and the base of the tang of the knife or fork, the bolster and ferrule being connected to the handle and tang by means of soft solder or metal forced into the space in the handle and surrounding the tang extended into the hole in the handle, the said soft solder or metal also entering the space between the bolster and the base of the tang to constitute a firm backing for the bolster, so that it can be handled without fear of being indented or knocked in.

The combined bolster and ferrule herein shown is composed of two similar pieces of sheet metal formed to shape in dies, the ferrule end of the pieces being shaped to fit the end of the handle, while the bolster end is more or less tapered and has an elongated slot of a width just sufficient to receive and fit the base of the tang of the knife-blade or fork.

A knife and fork having my improved bolster and ferrule applied thereto will be found to be very durable and strong, and they may be made highly ornamental, so that the cutlery is more pleasing and capable of being sold more readily and at a higher price than usual cutlery.

Figure 1, in side elevation, represents a knife having a handle provided with a ferrule and bolster made in accordance with my invention. Fig. 2 is a similar side elevation with the handle and combined ferrule and bolster broken out, the figure showing the means employed to attach the ferrule and the tang to the handle substantially solid. Fig. 3 shows, somewhat enlarged, in perspective, a view of the combined ferrule and bolster. Fig. 4 shows one-half of the shell constituting the combined ferrule and bolster. Fig. 5 is a section taken through the handle and its attaching means in the line $x$, Fig. 2, looking to the right.

Referring to the drawings, $a$ represents a knife, it having a tang $a'$, which may be extended into a suitable hole made in a handle $b$ of any usual or desired material. This tang may be notched at its edges for a purpose to be described. The inner end of the handle, as shown in Fig. 2, is reduced in diameter to thereby leave a shoulder, as $b^2$, against which may act one end of a combined ferrule and bolster $c$ $c'$.

The combined ferrule and bolster is composed of two similar halves or shells concavo-convex at one end to make the ferrule and tapered at $c^2$ to constitute the bolster. The metal from which this bolster will be made will preferably be in the form of sheet metal, and it will be laid in a suitable die suitably cut or ornamented, so that when the metal is struck into it in usual manner the metal will be provided with suitable ornamentations, as $c^3$, to constitute the ferrule, while the opposite end of the blank will be tapered or reduced, as at $c^2$, to shape it to constitute the bolster, a portion of the metal turning a corner, as at $c^4$, so as to leave a slot $c^5$ in the bolster part of the ferrule when the two halves constituting the bolster and ferrule are brought together, said slot being of greater or less length, according to the width of the tang, and being just wide enough to embrace the metal of the tang, whether a knife or fork. These two shells may be soldered or brazed together in the dotted line $x$, Fig. 3, at both edges, thereby constituting the combined ferrule and bolster, the ferrule end being shaped to surround the inner end of the handle, while the bolster end is adapted to fit snugly the tang of the cutlery, whether a knife-blade or fork-shank, the bolster end meeting the shoulders 3 4 of the blade at the base of the tang. Herein I have chosen for additional strength in the bolster to throw out from the same in the process of forming the metal into shape a bead, as $d$.

To unite the combined ferrule and bolster to the handle and to the tang of the knife or fork, I employ soft solder or metal, (shown at $h$,) and to apply this soft solder or metal I place the ferrule end of the combined ferrule and bolster upon the handle and then insert the tang through the slot at the bolster end of the combined ferrule and bolster, inserting the tang into the usual hole in the handle, and thereafter I force into the usual tang-receiving hole of the handle, through a suitable opening $h'$ in the handle, the said solder or soft metal, it flowing around the tang and entering the space between the surrounding bolster and the tang at its base, the said soft metal or solder filling the bolster end of the ferrule and bolster, thereby effectually bracing the interior of said bolster end against any liability of its being battered in or indented in use. The soft metal or solder adheres firmly and solidly to the exterior of the tang and to the interior of the bolster and also to the interior of the handle, and the stub or prong of the soft solder or metal standing in the hole $h'$ in the handle also forms a lock to prevent the withdrawal of the tang from the handle.

I may, if desired, score the tang and the handle, as at $h^2$, so that the metal may flow about the tang and enter said scores, thereby affording additional holding means to retain the tang in the handle.

Fig. 5 shows the handle in cross-section with its tang embraced at each side by the soft metal $h$, it filling, when hardened, the hole in the handle.

The soft solder or metal constitutes locking means for confining the handle, bolster, and shank together firmly.

Having described my invention, what I claim as new, and desire to secure by Letters Patent, is—

In table-cutlery, the combination with a handle and tang, of a combined ferrule and bolster shaped at its ferrule end to fit the inner end of the handle and at its bolster end to receive and embrace the tang at its base, and locking means composed of soft metal filling the bolster and the hole in the handle and surrounding the tang inside the handle and bolster, substantially as described.

In testimony whereof I have signed my name to this specification in the presence of two subscribing witnesses.

FREDERICK B. RISING.

Witnesses:
 H. A. HURLIN,
 M. J. ABBOTT.